US006621585B1

(12) United States Patent
Patel et al.

(10) Patent No.: US 6,621,585 B1
(45) Date of Patent: Sep. 16, 2003

(54) METHOD AND APPARATUS FOR REGISTER MARK IDENTIFICATION

(75) Inventors: Manojkumar Patel, Princeton Junction, NJ (US); Piyushkumar Patel, Bergenfield, NJ (US)

(73) Assignee: Innolutions, Inc., Windsor, NJ (US)

( * ) Notice: Subject to any disclaimer, the term of this patent is extended or adjusted under 35 U.S.C. 154(b) by 0 days.

(21) Appl. No.: 09/486,684

(22) PCT Filed: Sep. 2, 1998

(86) PCT No.: PCT/US98/18207

§ 371 (c)(1), (2), (4) Date: Mar. 1, 2000

(87) PCT Pub. No.: WO99/12125

PCT Pub. Date: Mar. 11, 1999

Related U.S. Application Data

(60) Provisional application No. 60/057,320, filed on Sep. 2, 1997.

(51) Int. Cl.[7] ................................................ G06F 15/00

(52) U.S. Cl. ........................ 358/1.12; 358/1.1; 358/1.4; 358/1.5; 358/1.9; 382/287

(58) Field of Search ................................ 358/1.12, 1.1, 358/1.4, 1.5, 1.9; 101/211, 181, 189, 485, 490, 484, 483; 382/287; 235/375, 435

(56) References Cited

U.S. PATENT DOCUMENTS

| | | | | | |
|---|---|---|---|---|---|
| 4,484,079 | A | * | 11/1984 | Betz et al. .................. | 250/548 |
| 4,794,453 | A | * | 12/1988 | Gnuechtel et al. .......... | 348/132 |
| 4,849,914 | A | * | 7/1989 | Medioni et al. ............ | 382/112 |
| 5,056,430 | A | * | 10/1991 | Bayerlein et al. ........... | 101/211 |
| 6,026,172 | A | * | 2/2000 | Lewis, Jr. et al. .......... | 382/106 |

* cited by examiner

*Primary Examiner*—Mark Wallerson
*Assistant Examiner*—Twyler Lamb
(74) *Attorney, Agent, or Firm*—W. Patrick Quast, Esq.

(57) ABSTRACT

A Color Register Control system used to maintain close registration between colors printed on a surface by various printing cylinders. The control system acquires an image of a cluster of register marks printed by various printing cylinders. The register mark is a geometrically unique mark, The mark cluster is acquired by the camera and each mark pattern is identified by checking shape of individual marks. Resulting location of a mark is used to compute and correct registration errors. The image is analyzed to identify marks printed by various printing cylinders. Register error is determined by computing the lateral and circumferential distance between marks printed by a print cylinder and a master print cylinder. Any error detected in this process is corrected by activating correction motors typically stepper motors, on print cylinders. The control utilizes a commercially available IBM-PC compatible computer, which can accept additional boards in the expansion slots for indicated purposes.

19 Claims, 16 Drawing Sheets

METHOD AND APPARATUS FOR REGISTER MARK IDENTIFICATION

This application claims the benefit of provisional application Ser. No. 60/057,320, filed Sep. 2, 1997

FIELD OF THE INVENTION

Apparatus and method particularly suitable for use with closed loop color to color registration system of a web printing apparatus including a unique graphical user interface and register mark identification scheme.

BACKGROUND OF THE INVENTION

It is known in the prior art to search out register mark patterns which reoccur.

Procedures useful in accomplishing this involve the identification of repetitive color marks as they appear in this recurring format. Techniques to date include determining and correlating position and color information for recurring elements in a repetitive pattern.

One such scheme searches out the existence of substantially identical dot pairs in each pattern and then their reoccurrence in subsequent patterns.

Further in prior art system interface schemes, technology has only advanced to the point of permitting the inputting of key parameters and related changes through the combined coordination of visual display and keyboard entries.

SUMMARY OF THE INVENTION

The function of a Color Register Control system on a printing press is to maintain close registration between colors printed on a surface by various printing cylinders. The control acquires an image of a cluster of register marks printed by various printing cylinders. The register mark is a geometrically unique mark. The mark cluster is acquired by the camera and each mark pattern is identified by checking shape of individual marks. Resulting location of a mark is used to compute and correct registration errors. The image is analyzed to identify marks printed by various printing cylinders. Register error is determined by computing the lateral and circumferential distance between marks printed by a print cylinder and a master print cylinder. Any error detected in this process is corrected by activating correction motors, typically stepper motors, on print cylinders.

The control utilizes a commercially available IBM-PC compatible computer, which can accept additional boards in the expansion slots.

A commercially available touch-screen monitor is utilized in a unique way for operator interface so as to accept operator commands and to display results utilizing only the touch-screen monitor.

BRIEF DESCRIPTION OF DRAWINGS:

Following are the details of the attached figures.

FIG. 5 and FIGS. 5A through 5K depict various screen displays encountered in the graphical user interface portion of the present invention (there is no FIG. 5I).

DESCRIPTION OF THE PREFERRED EMBODIMENT

Figure 1:
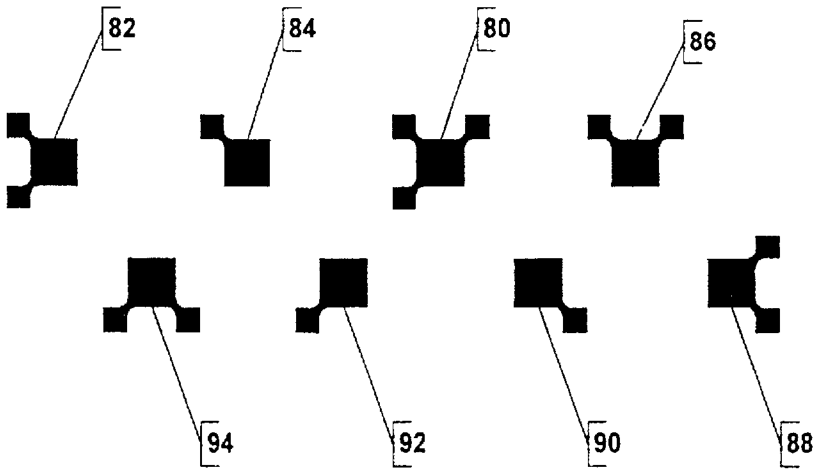
FIG. 1 is an illustration of typical mark pattern on one surface. Each mark is of unique geometrical shape. Each mark is printed by a separate printing cylinder. All marks are shown in register.
Figure 1A:
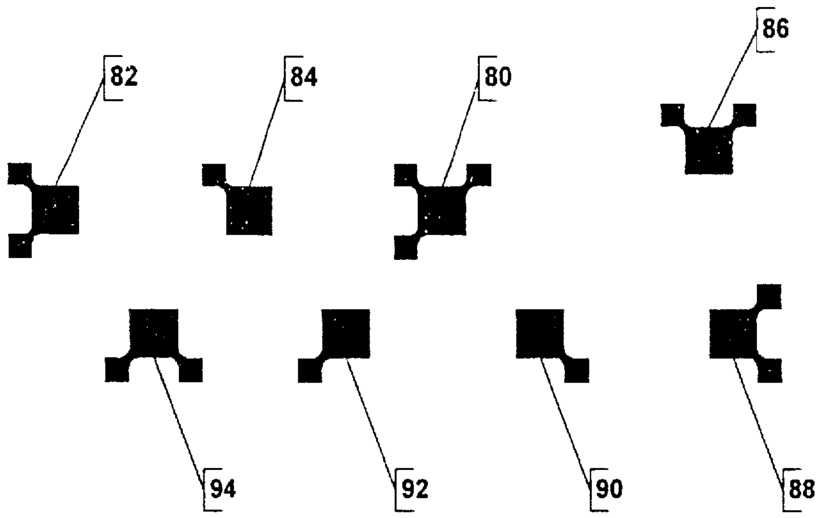
FIG. 1A is an illustration of typical mark pattern on one surface, shown with a registration error (#86).

Typical printing process on a printing press utilizes printing cylinders to print an image on a surface of web. Print cylinders are driven with drive shaft. Since this is a repetitive process, the register mark printed by a printing cylinder remains reasonably at the same location from one impression to other impression. Each print cylinder prints a geometrically distinct mark on one surface as illustrated in FIG. 1 (80–94). All register marks on a web surface form a cluster of register marks. There can be multiple clusters on a web surface at different locations.

The touch screen operator interface allows the operator to interact with the control for specifying various operating parameters for the process. Depending on the printed surface requirements, an operator can enable or disable a complete web surface in the control. Operating buttons specific to the disabled web are not displayed on the control. Operator can also specify the number of printing cylinders active in the total printing system. Additional printing cylinders not being utilized are not displayed on the operator interface with active print cylinders spaced out on the control panel for ease of operation. Operator can also define multiple printing cylinder as non-printing cylinders, which are still displayed on the operator interface but no further operations are allowed for those printing cylinders.

From all print cylinders printing on a web surface, operator can specify a print cylinder as a master print cylinder. During automatic operations, this cylinder is not moved and all register errors for other print cylinders printing on this surface are calculated with master print cylinder register mark location as the reference location.

With the touch screen interface, operator can also re-assign any print cylinder to any web surface, indicating that the selected print cylinder is printing on the selected web surface.

A register mark cluster consists of multiple mark patterns printed on a web surface. Each register mark is geometrically of unique shape, printed by a specific print cylinder. During set up, operator also specifies the pattern of mark printed by a specific print cylinder.

Figure 6:
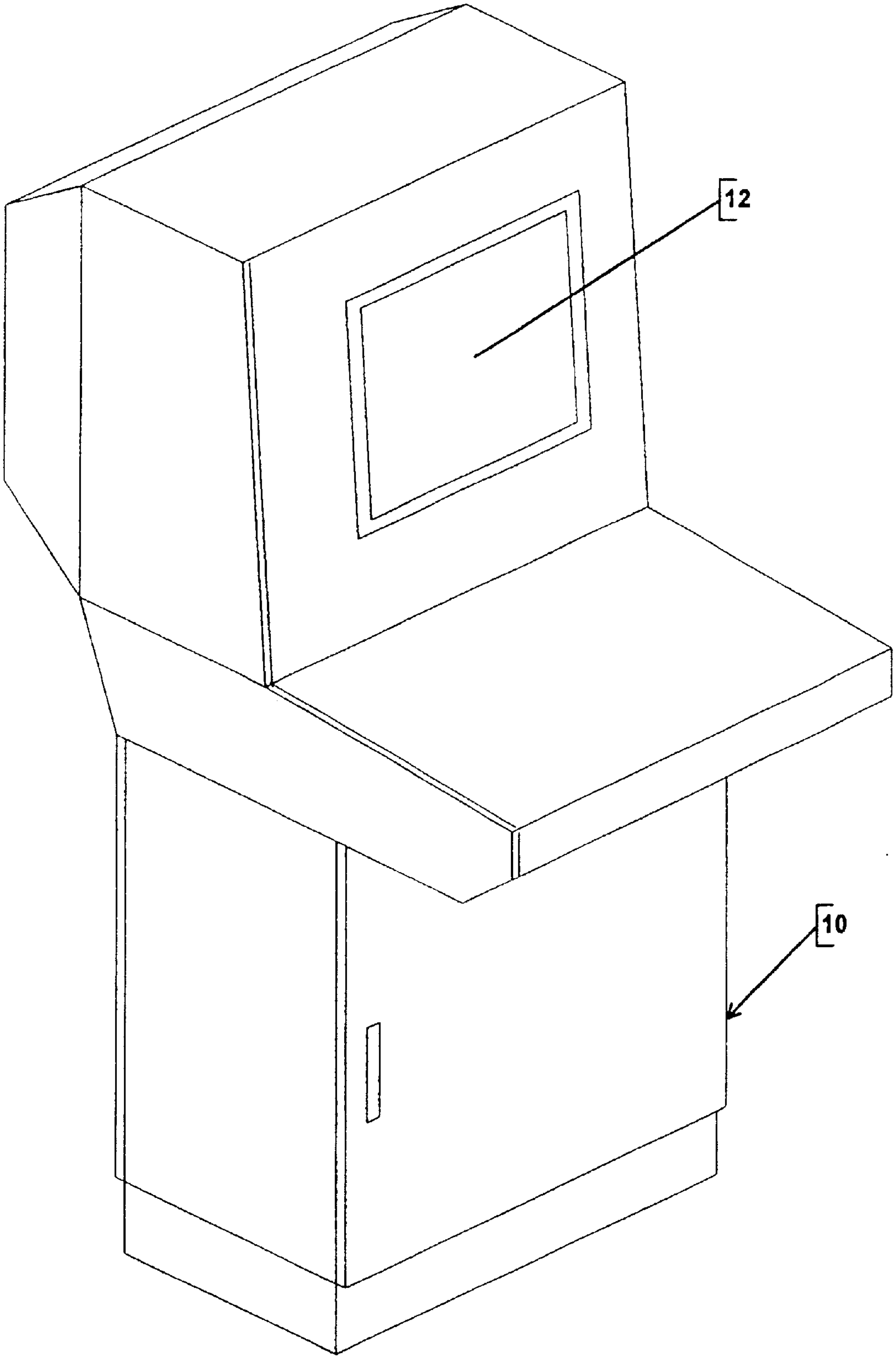
FIG. 6 is a perspective view of the control console used in the implementation of the system of the present invention.

The Color Register Control console 10 (see FIG. 6) utilizes a 17" Capacitive Touch Screen Monitor(12), commercially available from Pixel Touch Company. A capacitive touch screen arrangement utilizes a glass overlay in front of the CRT of the monitor. The glass overlay is coated with an electrically conductive transparent coating. The overlay is connected to a controller card, which determines the position where the screen is touched. The touched coordinate information is transmitted to the personal computer operating system, like Windows 95, through serial communication port. A mouse emulating software drivers are provided by the touch screen manufacturer to emulate screen touch as mouse movement and clicks. The display area utilizes high resolution, 1024 pixel×768 pixel, to display all icons and information on the screen.

The graphical user interface for the control is designed utilizing a commercially available software package such as Visual Basic by Microsoft. This software is used to create graphical user interface elements like Windows buttons and panels.

Figure 5:
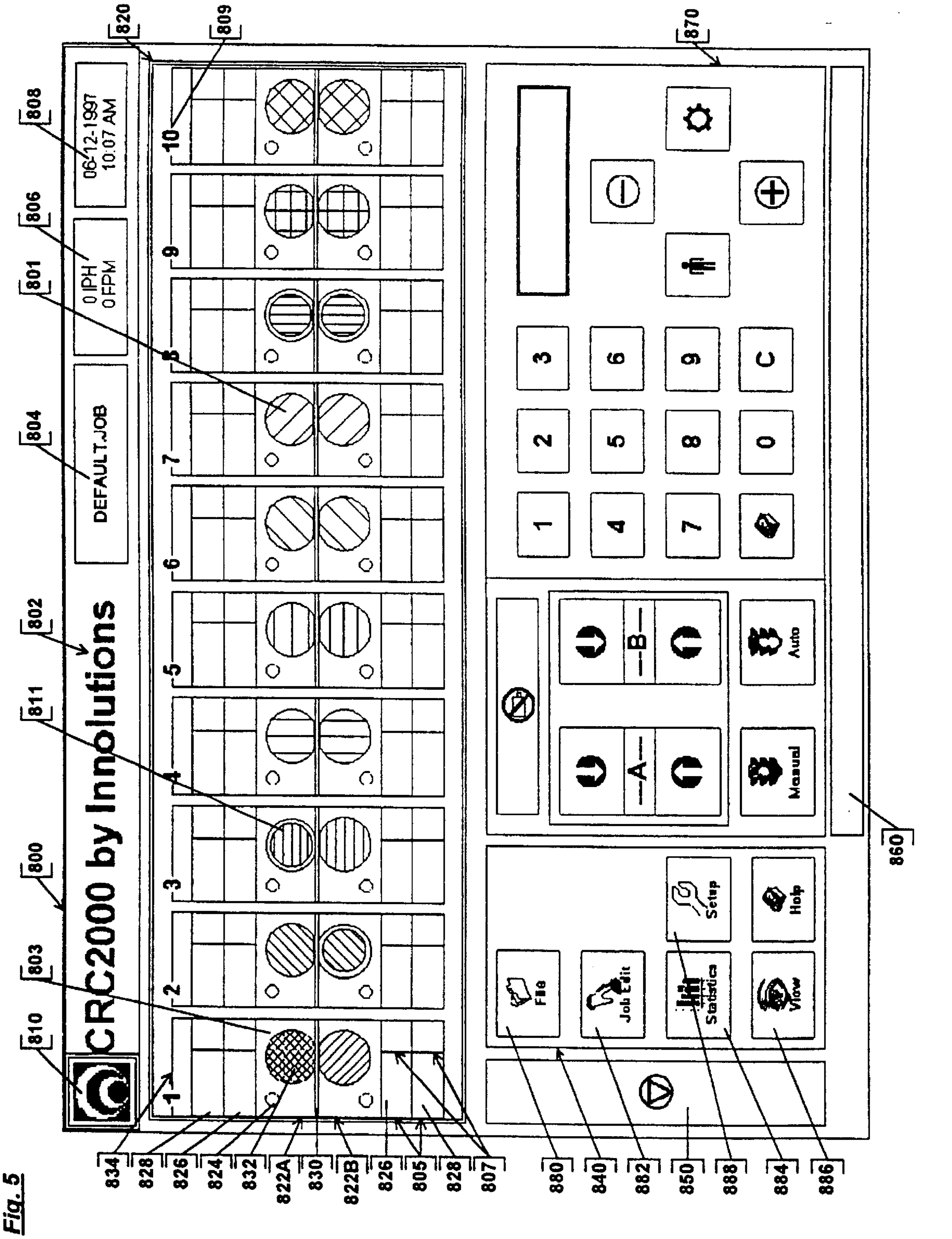

The main control panel (#800) of the control, displayed in FIG. 5. is divided into various functional groups, each consisting of one or more components. The group on the top of the screen (#802) displays the current job name (#804), printing press speed in Impressions Per Hour and in Feet per minute (#806), current date and time (#808). The company logo (#810) on the top left corner of the screen is also utilized to access parameters for the control through password protected access. It would be used to change operating parameters of the system, e.g., number of print cylinders, activation speed, motor speed and active surfaces.

The Press Status Window group (#820) displays the status of all printing cylinders (#822A and #822B) in the system. Information in this window is updated every 1 second. All print cylinders are circles filled with color assigned by the control operator. A white color of a cylinder (e.g. #801) indicates that the cylinder is a non printing cylinder. It cannot be selected for any further operations until a non-white color is assigned to the print cylinder.

A cylinder can be selected for a desired operation by touching the cylinder or the rectangular gray area (#803) around the cylinder. Cylinder selection is indicated by flashing hatched lines (#832) in the filled area of the circle. Selection of a cylinder can be canceled by again selecting the selected cylinder.

Next to each cylinder, a cylinder status circle (#824) is included to emulate a status light. The fill color of the status circle changes according to the status of the print cylinder. When the cylinder status is MANUAL, the status circle is transparent. When switched to AUTO mode, and a corresponding register mark is found, the fill color of the status circle is green. If the cylinder is in AUTO mode but a corresponding register mark is not identified, the fill color of the status circle is red. If the cylinder is switched to a Manual Override mode, the status circle is filled with blinking yellow color.

Next to the cylinder area, a dark gray background window (#826) is provided to display Circumferential Register error/correction and another dark gray area (#828) is provided to display Lateral Register error/correction. These areas are divided in two parts. The bigger portion (e.g. #805) displays the amount of error; and the smaller portion (e.g. #807) displays the direction of register motor movement. Error and direction information are displayed until the time when the register motor is making correction moves. A white line (#830) between the two cylinders (#822A and #822B) indicates the substrate being printed. Top and bottom printing cylinder with the status circle and register error display areas are included in a vertical rectangular frame to represent a perfecting printing press unit (#834). Complete printing press can be represented by up to 10 printing press units with a total of 20 printing cylinders. A number (#809) is assigned to each printing unit for ease of identification. A complete printing press unit can be selected by touching a rectangular area around the Press Unit Number. The selected printing press unit is displayed with flashing cyan color. The printing press unit selection can be canceled by again selecting the selected printing press unit.

Different information about the print cylinders is displayed in the register display area, based on selected control function.

A Control Button Window group (#840) is provided with a group of control buttons used to access different functions of the control. It consists of buttons to access a job file management window (#880), a job edit window (#882), a statistics window (#884). a view window (#886), a setup window (#888) and a help window (a further help button is provided in each window to access context sensitive help). Buttons are enabled and disabled in this window depending on the type of functions desired to be accessed by the operator.

A Panic Button (#850) is provided and it is active and available on the screen at all times except when accessing the help information.

A Main Message Window (#860) displays system messages for the operator. The control periodically displays any error messages or status messages in this window.

A Variable Window (#870) displays additional windows depending on the operator selected functions as described hereinafter.

Figure 5A:
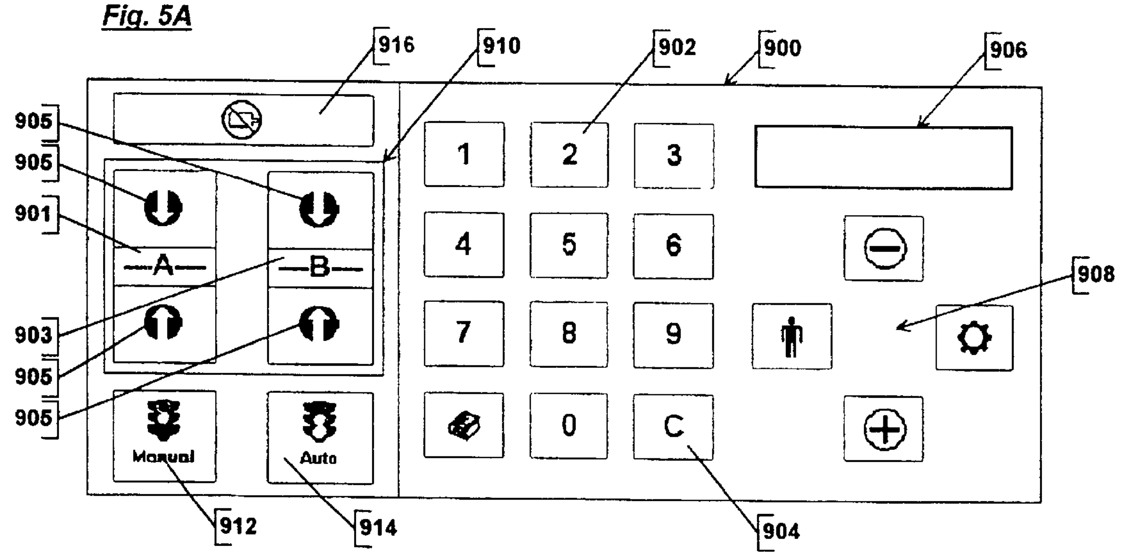

During normal running, this Variable Window displays a keypad with operating controls (#900) as illustrated in FIG. 5A. The window displays numeric keys (#902) from 0 to 9 in a typical format similar to a telephone. In addition to the numbers, a Clear key (#904) is provided. Operator touches the clear key to clear any numeric value input. Any numeric value input by the operator by touching numeric keys is also displayed in the keypad display area (#906). Four Movement Direction Keys (#908) are provided to specify the direction of the movement for the register motors. To move a print cylinder, the operator first selects the print cylinder in the Print Status Window group (#820) by touching it; followed by touching keys (#902) required to enter the amount of movement; followed by touching the direction key corresponding to one of the four desired directions-the "man silhouette" and the "gear" are used for lateral direction changes, while the "+" and "–" cover circumferential corrections.

In addition to these keys, the Keypad also consists of Surface Selection Key group (#910), MANUAL key (#912), AUTO key (#914) and Motor Enable/Disable Key (#916). The Surface Selection Key group may display four keys to indicate up to four surfaces of two webs identified as A and B webs (#901 and #903). The arrow icon on these keys indicate the direction of printing on the web.

Color of the icons in respective areas (#905) change with the status of the surface. When surface is in MANUAL, the respective area is painted red. When surface is in AUTO mode, the area is painted green. When motors on a surface are disabled, the areas are painted yellow.

When control is searching for the register mark cluster on a surface, the icon on the corresponding surface selection key group moves up and down in bouncing motion, indicating the control is in a search mode for that specific surface.

Surfaces can be switched to MANUAL mode by selecting required surfaces and then touching the MANUAL key (#912). Surfaces can be locked in AUTO mode by selecting required surfaces and then touching the AUTO key (#914). Once locked in AUTO, individual print cylinders can be switched to Manual Override mode by selecting a locked cylinder and then touching the MANUAL key. While locking surfaces in AUTO mode, operator has three choices, indicated with a pop up window with three buttons. The first button is captioned "IDEAL". If an operator selects this button, the control searches for all register marks in a cluster and once identified, it brings the relation between the marks to the ideal value. The second button is captioned "CURRENT". If an operator selects this button, the control searches for all register marks in a cluster and once identified, it maintains the current found position of the register marks. The third button is captioned "LAST". If an operator selects this button, the control searches for all register marks in a cluster and once identified, the control brings the register mark to the relationship of the last job run.

Figure 5B:
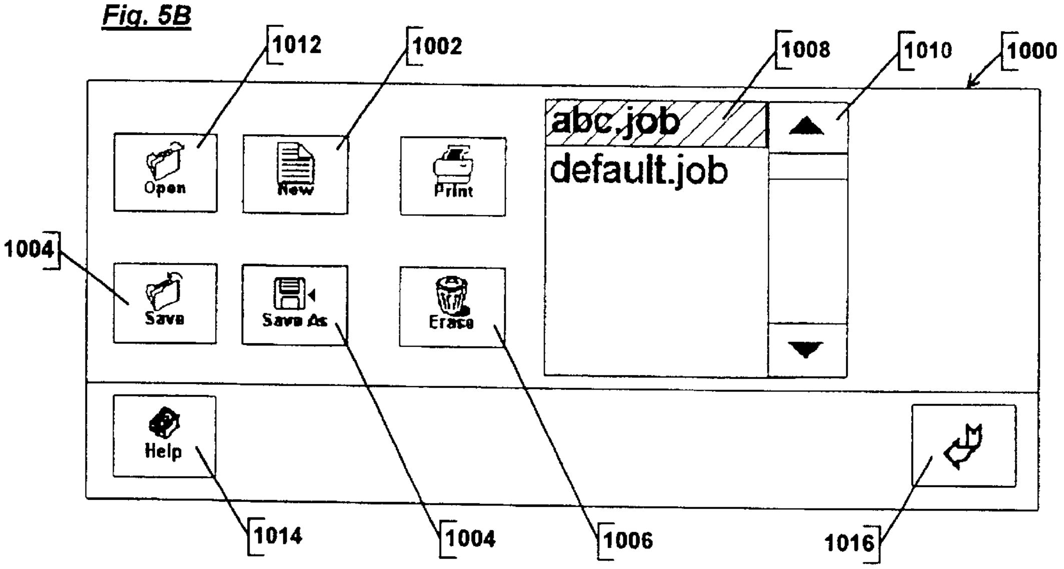

Touching the "FILE" key (#880) opens a File utilities window (#1000) in the Variable Window Area, illustrated in FIG. 5B. This window consists of following keys:

If the operator touches "NEW" key (#1002), the control loads a DEFAULT job in the memory. If the operator touches "SAVE" key (#1004), current job is saved in back in the same file. If the operator touches "SAVE AS" key (#1006), a keyboard window pops up. Operator can input new name of the job file by touching appropriate alpha-numeric labeled keys to define the new file name. If a job file already exists with the same name, the control displays a confirmation pop up window. If operator accepts, current job file details are stored in the existing file. If operator does not accept to overwrite existing job file, the operation is aborted. If the operator touches "ERASE" key (#1006), file selected in the file list window (#1008) is erased from the memory. Operator can select file from the file list window (#1008) by touching the file name in the window or by using the scroll bars (#1010) to move the selection. Before erasing the file from the memory, the control displays a confirmation pop up window. If operator accepts, selected file is erased from the memory. If operator does not accept, file erase operation is aborted. If operator touches "OPEN" key, the file selected in the file list window (# 1008) is loaded in the memory and current file name is updated. A "HELP" key (#1014) is provided for accessing context sensitive help on FILE operations. A "RETURN" key (#1016) is provided to return back to the MAIN screen (FIG. 5).

Figure 5C:
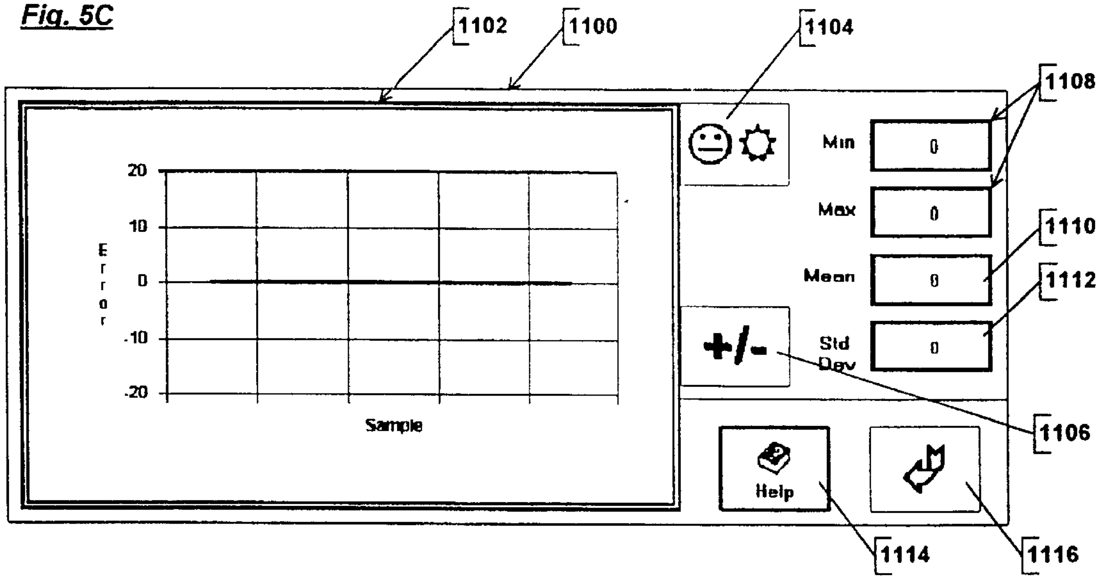

Touching the "STATISTICS" key (#884) on MAIN screen opens a statistical window (#1100) in the Variable Window Area, illustrated in FIG. 5C. This window consists of a graph window (#1102) giving sample number on the horizontal axis and error on the vertical axis. To view statistical results for the last sample of a pre-defined size, the operator first selects a print cylinder by touching the print cylinder in the Press Status Window (#820) and then touches the OPERATOR/GEAR" side key (#1104) or the "ADVANCE/RETARD" key (#1106). The graph window is updated to see the last sample results. Also, the statistical window displays extreme error (#1108) in last sample, mean error (#1110) in last sample and standard deviation (#1112) for the last sample. This result is very useful to the operator in fine tuning the press parameters to optimize the performance since it allows the operator to objectively compare the quality produced with two different settings and choose the best setting for the job. A "HELP" key (#1114) is provided to get immediate context sensitive help on Statistical Window and interpretation of results. A "RETURN" key (#1116) is provided to return back to the MAIN screen.

Figure 5D:
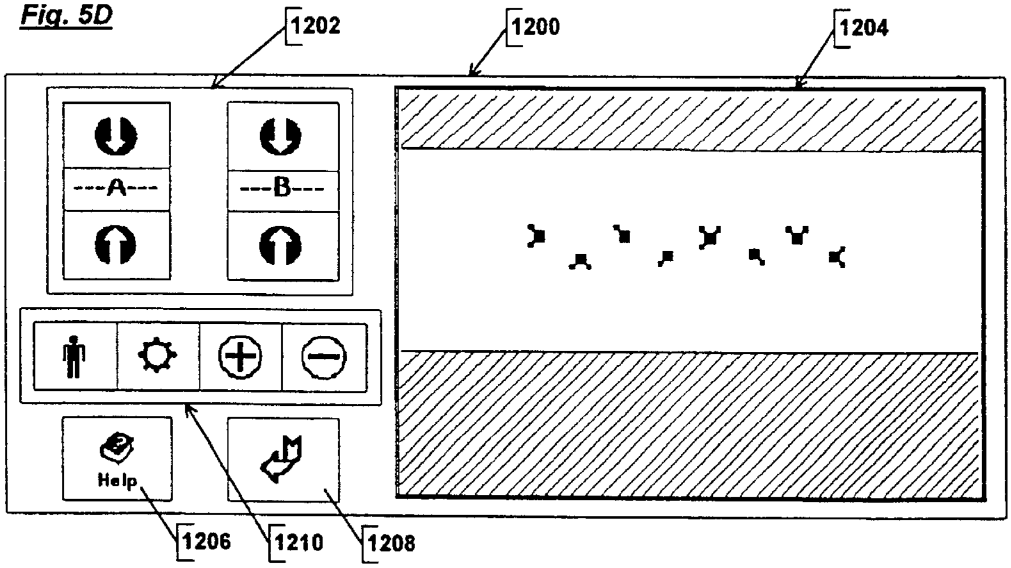

Touching the "VIEW" key (#886) opens a camera view window (#1200) in Variable Window, as illustrated in FIG. 5D. This window consists of a Surface Selection Key group (#1202) as explained earlier. It also consists of an image window (#1204) to display the exact image grabbed by the camera, in a smaller scale. The image is refreshed once every 1 second. A group of four keys (#1210) is provided to manually move the image assembly in appropriate direction for acquiring an image other than the operator specified location. A "HELP" key (#1206) is provided to get immediate context sensitive help on View Window. A "RETURN" key (#1208) is provided to return back to the MAIN screen.

Touching the "JOB EDIT" key (#882) opens the first of the several windows (FIGS. 5E to 5K) in the Variable Window location. Each window in this set of windows has a "HELP" key (e.g. #1302) for context sensitive help for that specific window. Each window in this set is also equipped with navigational keys. The "PREVIOUS" key (#1304) closes current window and opens a previous window. The "NEXT" key (#1306) opens next window and the "RETURN" key (#1308) returns control to the MAIN screen. An "UNDO" key (#1310) is provided on each window to discard all changes made during this setup and restore the settings to the values just prior to entering the Job Edit menus.

Figure 5E:
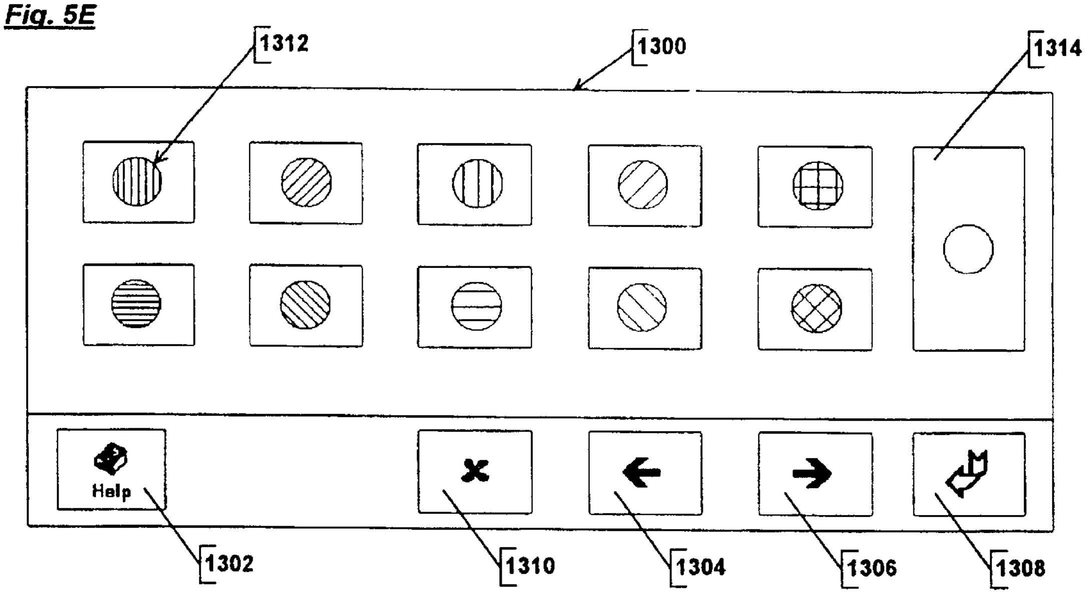

The first window opened under the "JOB EDIT" function is the "Color Assignment" window (#1300) as illustrated in FIG. 5E. This window consists of several keys with a captioned circle filled with different colors (#1312). One larger key is captioned with a white circle (#1314). To assign a specific identifying color to a print cylinder, the operator selects a print cylinder from the Press Status Window group (#820) by touching the cylinder and then touching the appropriate color key in the Color Assignment window. Assigning the color white to a cylinder indicates that the cylinder is non printing. A non-printing cylinder cannot be selected from any other window except from the Color Assignment window. This feature prevents the operator from erroneously selecting a print cylinder and moving it.

Figure 5F:
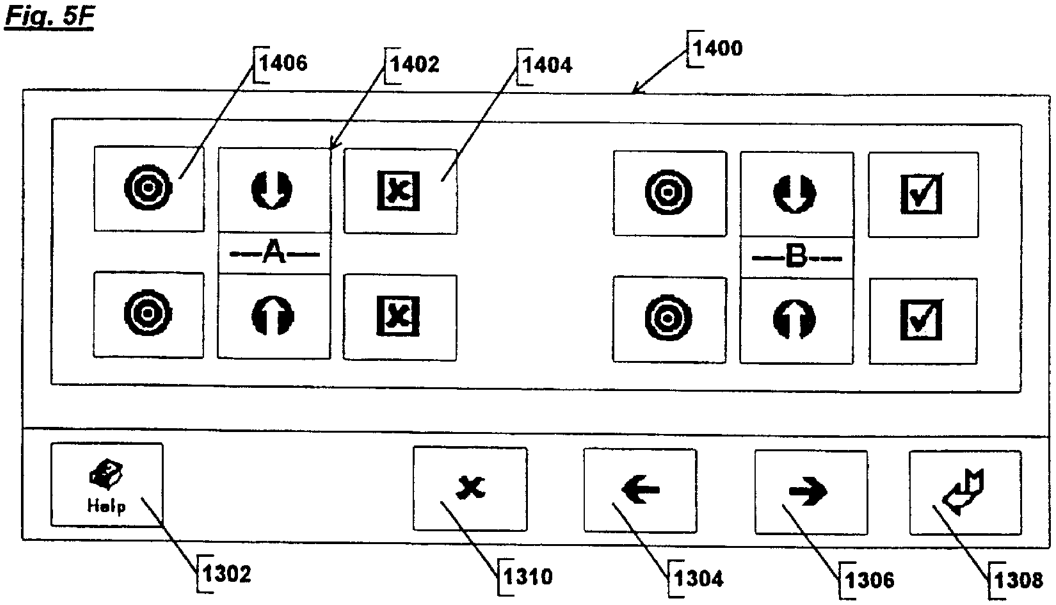

The second window opened is the "Surface Assignment" window (#1400) as illustrated in FIG. 5F. This window consists of Surface Selection Key set (#1402). Along with these keys, a surface Enable/Disable key (#1404) is provided which changes the state of the associated surface to Enabled or Disabled. Also, with each surface selection key, a master print cylinder select key (#1406) is provided. In order to define a print cylinder on a surface as a master print cylinder, the operator selects the required print cylinder and then touches the master print cylinder select key (#1406) corresponding to the surface on which the selected print cylinder is printing. The print cylinder once selected as a master print cylinder, adopts the color within the white ring appearance as, for example, #811 in FIG. 5.

This window is also used to re-assign a different surface to a print cylinder. To reassign a print cylinder to a different surface, the operator selects the required print cylinder followed by touching the surface selection key (#1402) on the window. This feature is very useful in setting up jobs for multiple webs and multiple web paths.

Figure 5G:
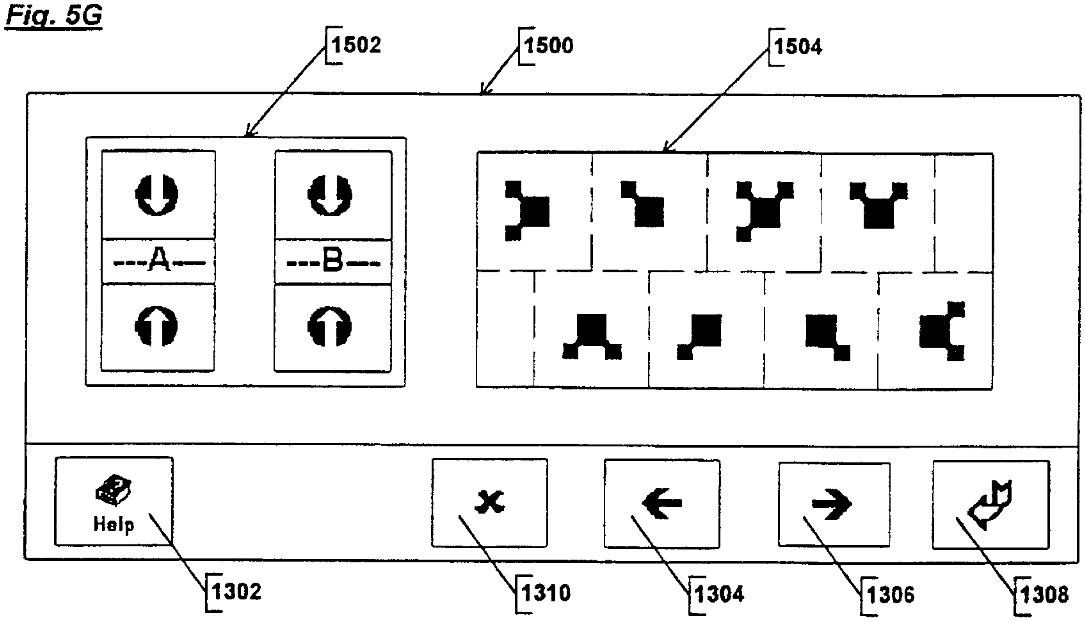

The third window opened is the "Region Assignment" window (#1500) as illustrated in FIG. 5G. This window consists of Surface Selection Key set (#1502). The operator touches appropriate surface key for which the region assignment is required. A Region Definition Window (#1504) consists of different lobed shapes of register mark and their relative position. To change a region assignment for a print cylinder, the operator selects a print cylinder and then touches the required mark pattern displayed in the Region Definition Window. The register mark schematic in the window is filled with the color of the print cylinder to which it is assigned. This procedure establishes link between different shapes and the print cylinder printing that specific shape.

Figure 5H:
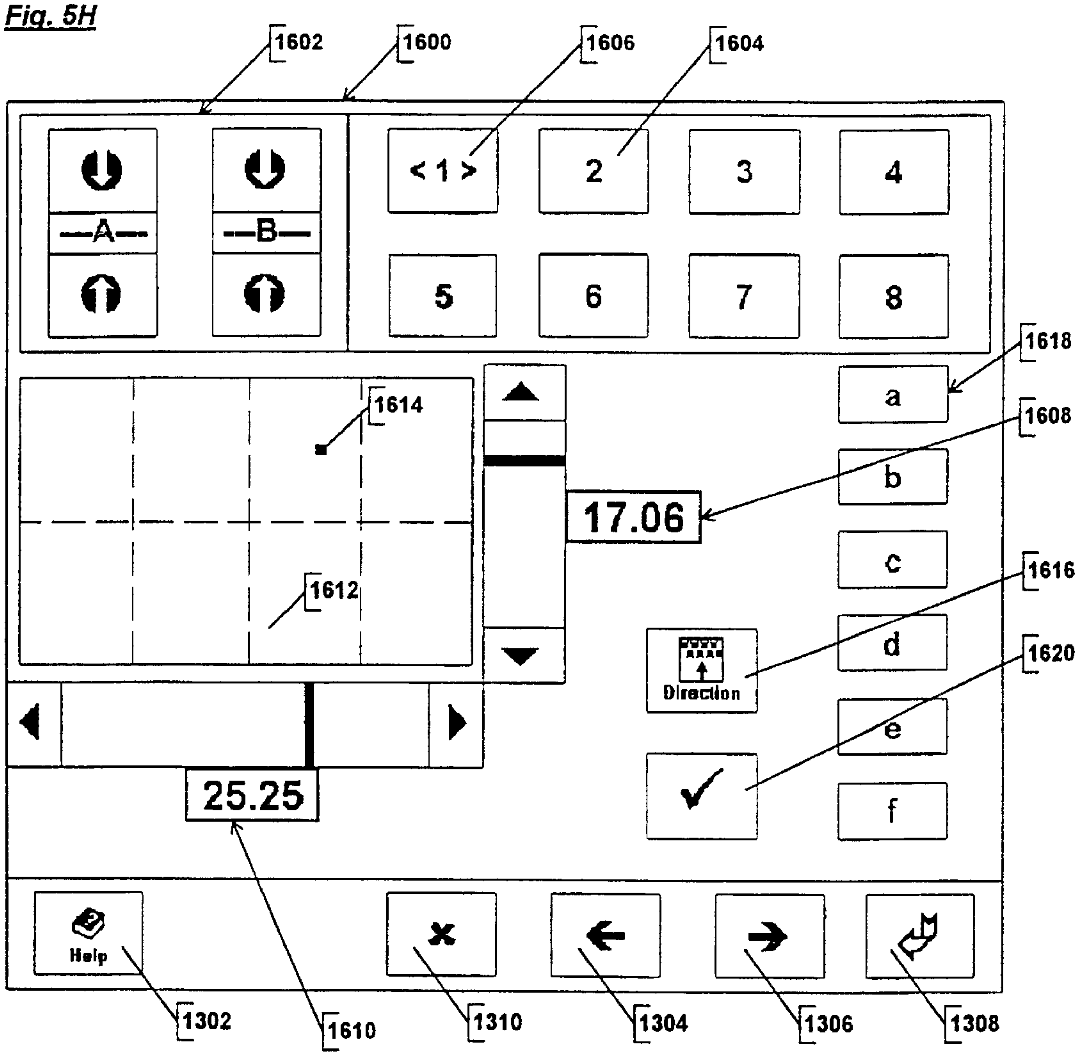

The fourth window opened is the "Target Assignment" window (#1600) as illustrated in FIG. 5H. This window consists of Surface Selection Key set (#1602). The operator touches appropriate surface key for which the target assignment is required. Each surface in the system can have up to eight target locations specified with the Target Number Keys (#1604). The Master Target followed by the imaging assembly is displayed by the target number captioned enclosed in braces (#1606). The operator selects the target by touching appropriate target numbered key (#1604). Circumferential location of the selected target is displayed in window (#1608). Lateral location of the selected target is displayed in window (#1610). Value of Circumferential and lateral location can be changed by touching the scroll bars adjacent to the corresponding value windows. Impression Window (#1612) represents one press repeat length of the web. Approximate location of the selected target is displayed by a red colored filled square mark (#1614) in the Impression Window (#1612). Orientation of the selected register mark cluster is displayed by the icon of the Orientation Button (#1616). This button works like a toggle. To change the orientation of the selected register mark cluster, operator touches this button. Preset Buttons a–f (#1618) are provided with pre-defined locations and orientation of the register mark clusters. To change location and orientation of the selected register mark cluster, operator simply touches appropriate Preset Buttons. After all editing is done for each surface, operator touches the "CONFIRM" key (#1620) to confirm the changes made to the register mark properties.

Figure 5J:
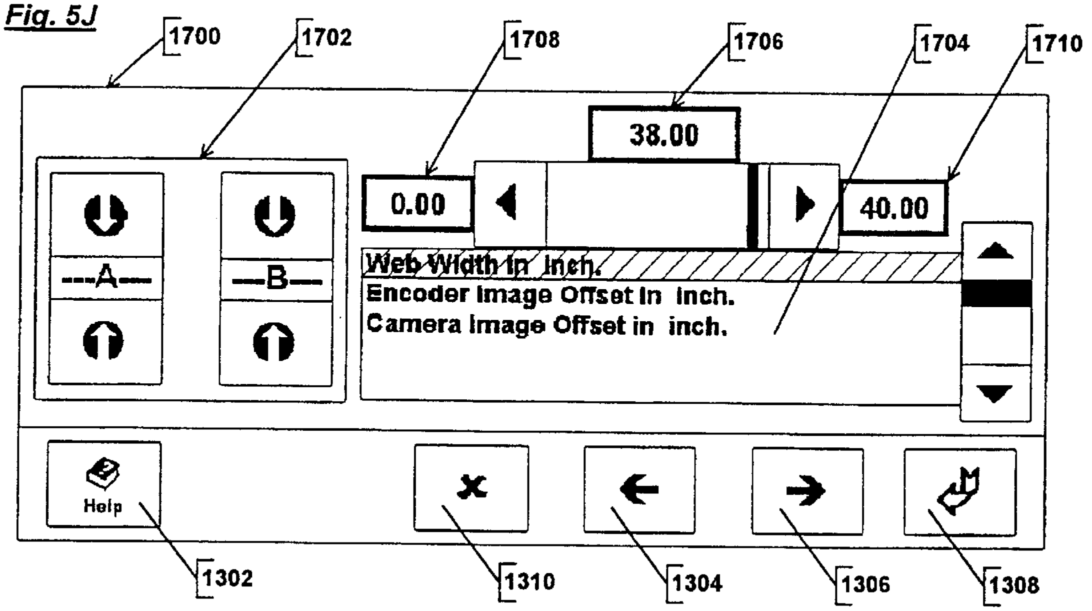

The fifth window is the "Surface Properties" window (#1700) as illustrated in FIG. 5J. This window consists of Surface Selection Key set (#1702). The operator touches appropriate surface key for which the Surface Properties definition is required. Required property is selected by touching one of the property descriptions listed in the Property List Window (#1704), or by touching the adjacent scroll bar. Current value of the property is displayed in window (#1706) with minimum possible value of the selected property displayed in window (#1708) and maximum possible value of the selected property displayed in window (#1710). Current value of the selected property can be changed with a scroll bar between minimum and maximum value windows.

Figure 5K:
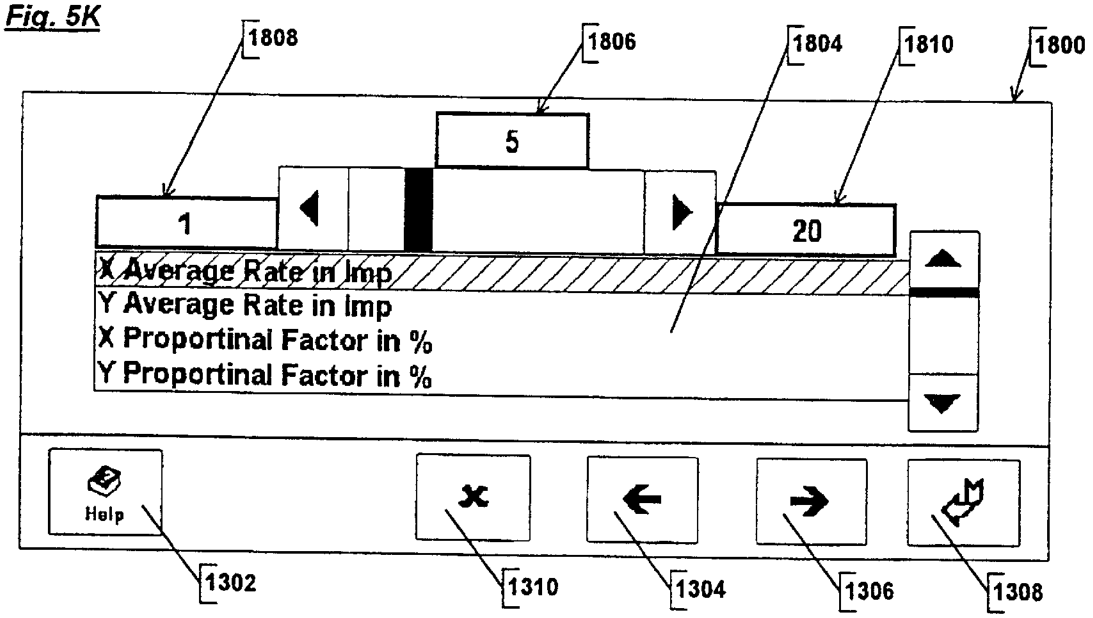

The sixth window is the "Cylinder Properties" window (#1800) as illustrated in FIG. 5K. The operator selects the print cylinder for which the Print Cylinder Properties definition is required. Required property is selected by touching the property description in Property List Window (#1804), or by touching the adjacent scroll bar. Current value of the property is displayed in window (#1806) with minimum possible value of the selected property displayed in window (#1808) and maximum possible value of the selected property displayed in window (#1810). Current value of the selected property can be changed with a scroll bar between minimum and maximum value windows.

Touching the "SETUP" key (#888) in the Control Button Window group (#840) opens a Maintenance and Setup window. This window consists of several key groups.

The first key group is for cylinder centering in lateral and Circumferential direction. In order to center the cylinders between corresponding limits, the operator selects the cylinders to be centered by touching the cylinders in the Press Status Window, followed by touching the key indicating Centering-Lateral or Centering-Circumferential. The selected cylinders start moving to one side until they detect a limit condition. Then the control starts counting time and it moves the cylinders in opposite direction until second limit is detected. The time lapse from first limit to second limit is calculated. Now, the control moves the cylinder towards the first limit for half the time lapsed for travel between first and second limit. This process is simultaneously performed for all selected print cylinders.

A second key group is used for calibrating the camera aperture for appropriate exposure. When this key is touched, all imaging modules for all surfaces start firing randomly. If a stationary image is pasted at the target location in front of the imaging module camera and press is run in slow run mode, the operator can watch the quality of the image grabbed and calibrate the camera aperture for required exposure. A help key is provided to get immediate context sensitive help on Setup Window. A RETURN key is provided to return back to the main menu.

The description now is directed to the unique method and system of the present invention for register mark identification. A typical register mark cluster is displayed in FIG. 1 (80–94), in which, each mark from #80 to #94 are printed by a different print cylinder. The mark clusters may be printed along the length or across the width of the web surface. Multiple mark cluster can be present on a printed surface. Each mark cluster carries a lateral position value circumferential position value and orientation value. During setup of machine, the operator specifies the mark cluster to be identified and followed. As soon as the operator specifies the mark cluster to be followed, the control pre-positions the camera module to save time and paper waste.

The control system utilizes an encoder (#714, see FIG. 4), driven from the drive shaft driving the print cylinder, to continuously monitor position of the drive shaft, and thus monitor the position of the print cylinder. An electronic Encoder Control Board is inserted in one of the expansion slots of the CPU. The function of this board is to continuously monitor the counts coming from the encoder. Up to four distinct counters are provided on a board for four printed surfaces. When the count from encoder matches a preset value for a specific surface, specified by the operator during set up procedure, the Encoder Control Board outputs a trigger signal of specific time duration and continues counting. For each surface to be monitored, one commercially available Frame Grabber board is also inserted in the CPU expansion slot. The function of this board is to acquire and store the image received from a charge coupled device (CCD) camera. Each surface is monitored by a commercially available CCD Camera such as Hitachi's KP-M1. The camera in this system is left free running and it is always on. Since the web to be inspected is moving at a high speed, a commercially available high speed high intensity strobe is fired to freeze the motion of the web. The trigger signal from the encoder board fires a strobe. The Frame Grabber acquires and stores the next complete frame image from the camera.

Figure 2:
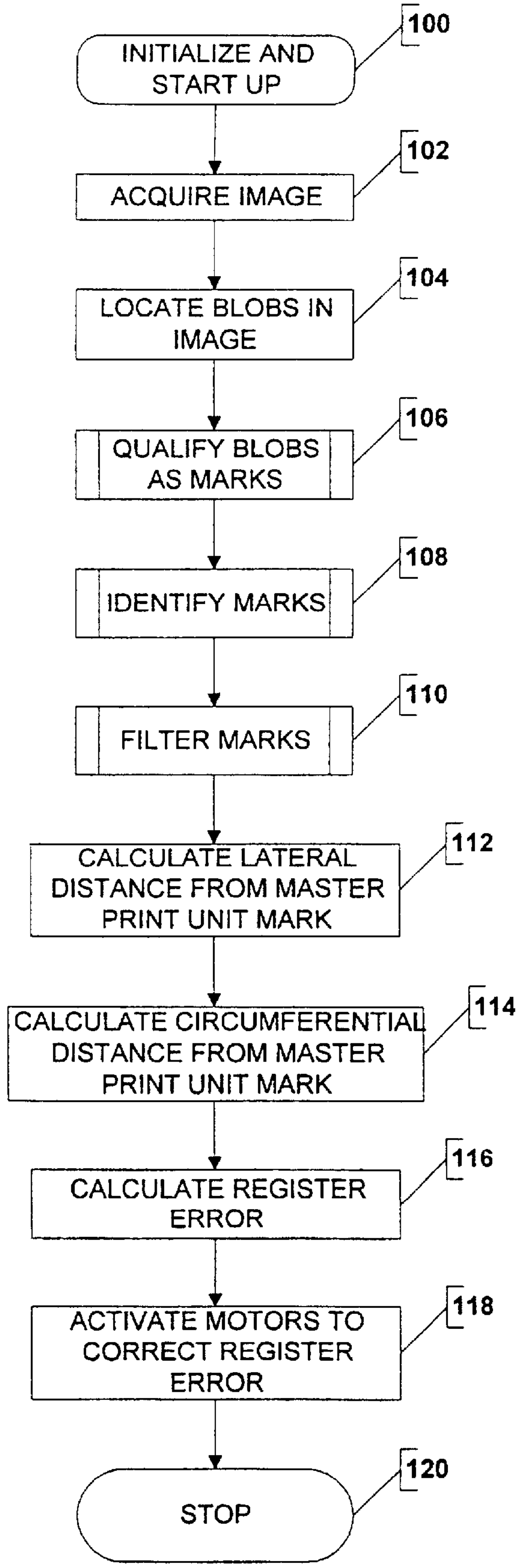
FIG. 2 is a block diagram giving details about general procedure for calculating and correcting register error.

The acquired image is then analyzed by the personal computer CPU, to identify the register marks in the image, and to calculate and correct register error. FIG. 2 gives a block diagram for the complete process. It starts with general housekeeping routines (#100) in the CPU. When Encoder Control Board gives a trigger signal for a specific web surface, the strobe light illuminates the web for a fraction of a second with a high intensity light burst. The Frame Grabber Board (#102) stores the next complete frame image from the camera image in the memory, to be subsequently used by CPU for further analysis. When Frame Grabber completes storing the image, it registers this event with the CPU. The CPU constantly monitors events registered by Frame Grabbers. If an Image Acquired event is registered from a Frame Grabber, CPU starts analyzing the image to locate blobs (#104) in the image memory of the Frame Grabber. Once all blobs are tagged, they are qualified (#106) as potential register marks.

Figure 2A:
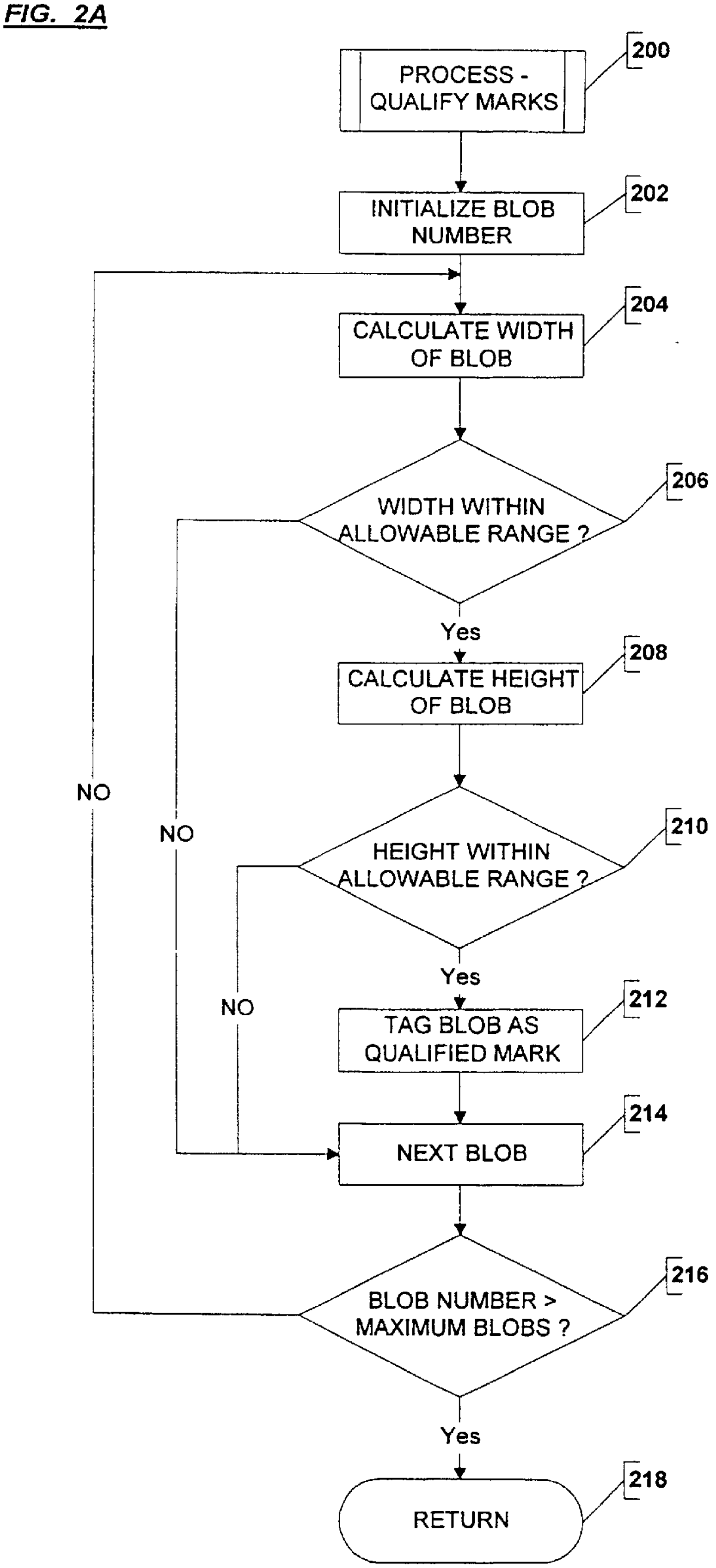
FIG. 2A is a block diagram giving details about qualifying blobs(block 106 in FIG. 2) in an acquired image as possible register marks.

FIG. 2A gives a block diagram of the "Qualify Marks" procedure (#106, #200). This process begins with initialization of blob number (#202). Width of each blob is calculated (#204) and it is confirmed to be within allowable range (#206). If the width is out of allowable range, the blob is rejected as a potential mark and next blob is analyzed (#214). Similarly, height of each blob is calculated (#208) and it is confirmed to be within allowable range (#210). If the height is out of allowable range, the blob is rejected as a potential mark. Once both conditions are satisfied, the blob is tagged as a qualified mark (#212). This procedure is performed for each blob in the image.

Figure 2B:
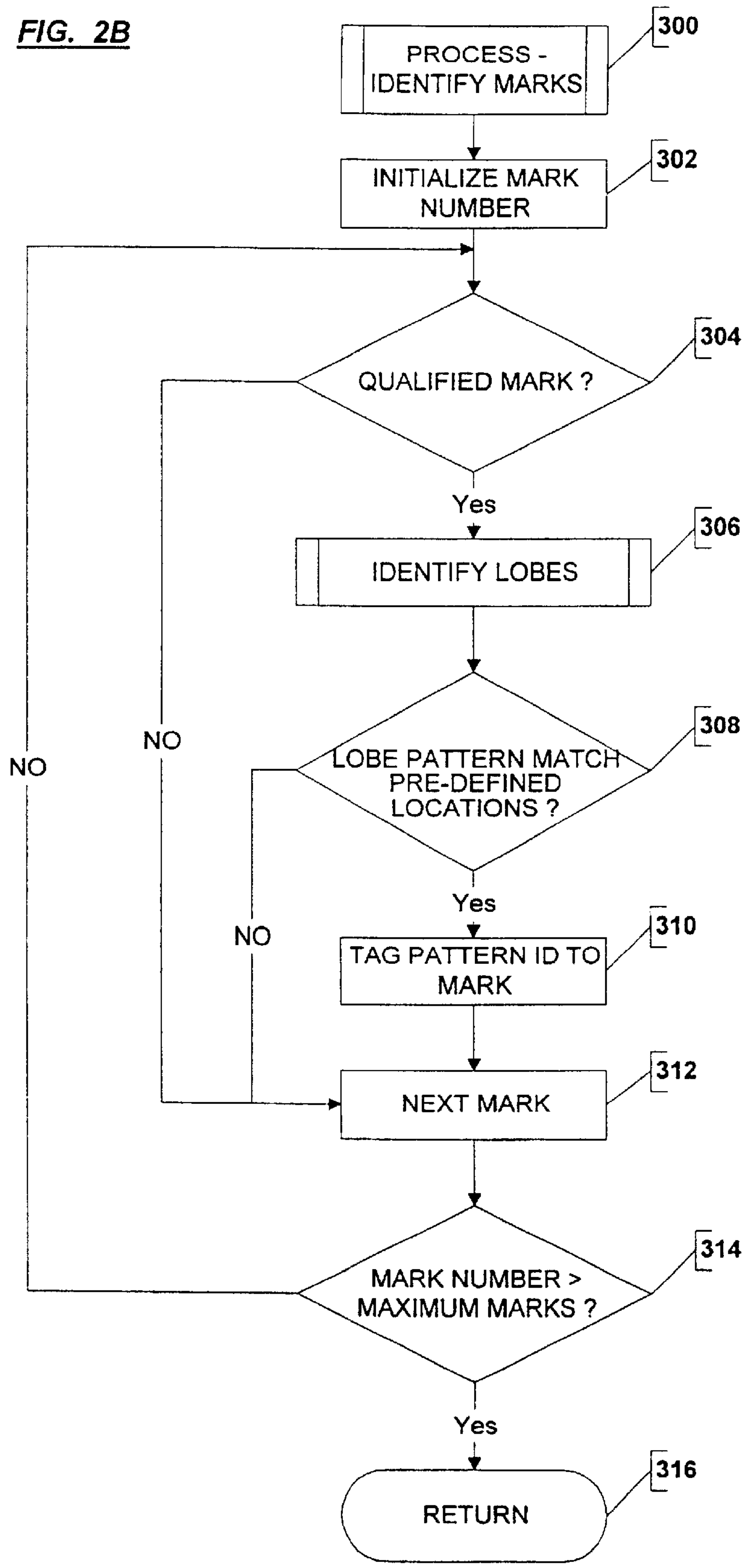
FIG. 2B is a block diagram giving details about identifying marks(block 108 in FIG. 2) to match with the predefined pattern of mark coming from a print cylinder.
Figure 2C:
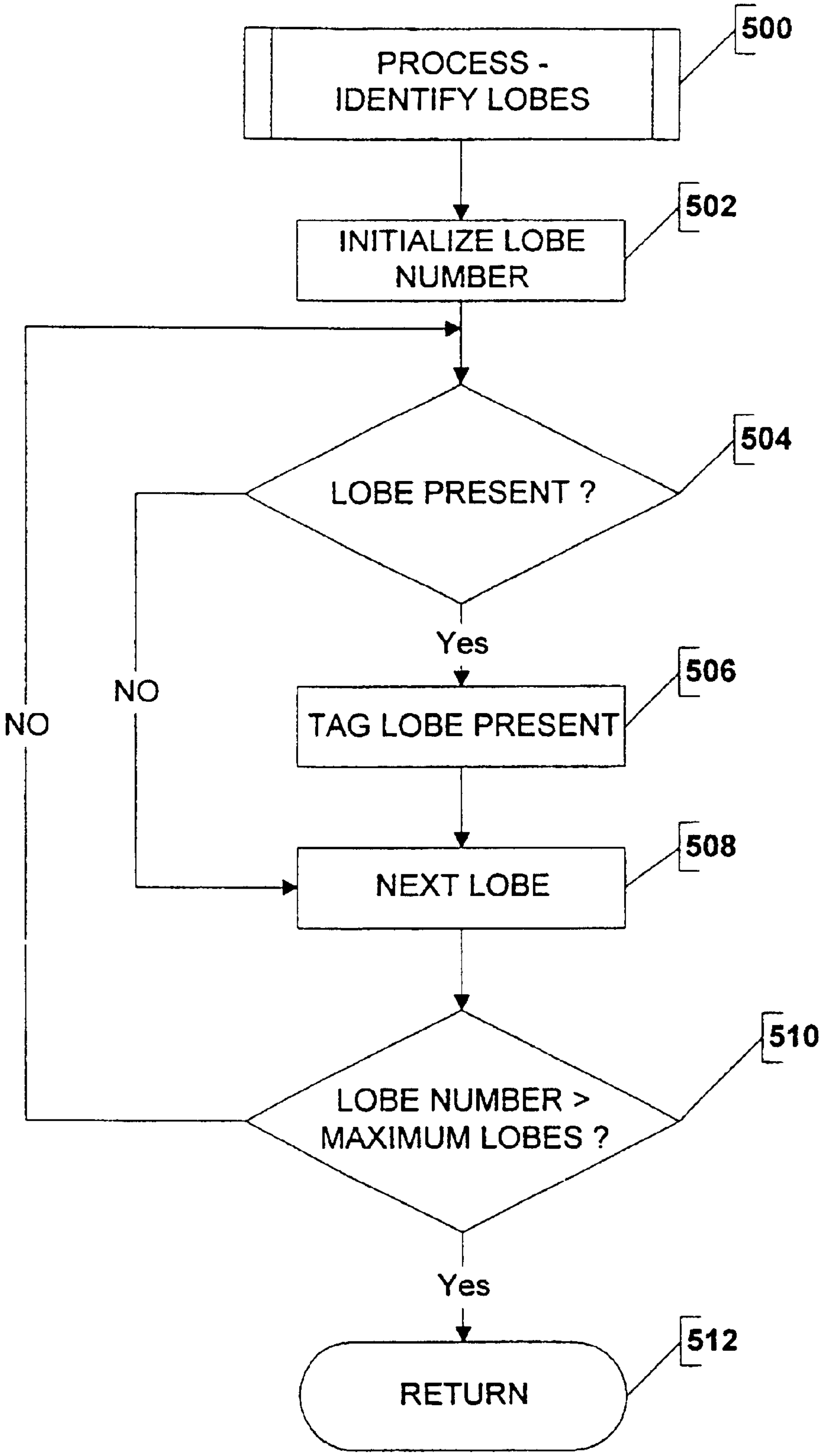
FIG. 2C is a block diagram giving details about identifying lobes(block 306 in FIG. 2B) around a qualified mark.

Subsequent to the "Qualify Marks" procedure, the "Identify Marks" procedure (#108, #300) of FIG. 2B is performed on each qualified mark to identify the mark pattern. The procedure begins with initializing mark number (#302). First the mark is checked if it is a qualified mark (#304). If the mark is not qualified then next mark is analyzed (#312). In order to identify the mark patterns, lobes around each mark are identified first (#306, #500). Referring to FIG. 2C, the "Identify Lobes" procedure (#306, #500) is performed as follows: the first step is to initialize lobe number. The CPU checks the specific mark for presence of the lobe (#504) by analyzing color value at the pre-defined lobe location. If the lobe is present, it is tagged to the mark (#506). Lobe number is then incremented (#508) to analyze next lobe location. This procedure is continued until all pre-defined lobe locations are analyzed (#510).

When all lobe locations are identified around all qualified marks, the lobe pattern of each mark is compared (#308) with standard patterns defined earlier. If the pre-defined register mark lobe pattern from a print cylinder matches with the lobe pattern of an identified register mark then the mark is tagged (#310) with the print cylinder identification number. indicating that the specific mark was identified to be printed by a matched print cylinder. The mark number is then incremented (#312) to analyze next mark. This procedure is performed for all qualified marks (#314).

For each register mark cluster, a register mark with a unique pattern is defined as the master register mark (#80). When all register marks in an image are identified, the following filtering procedure (#110, #400) is performed to filter erroneous marks detected in the above process.

Figure 2D:
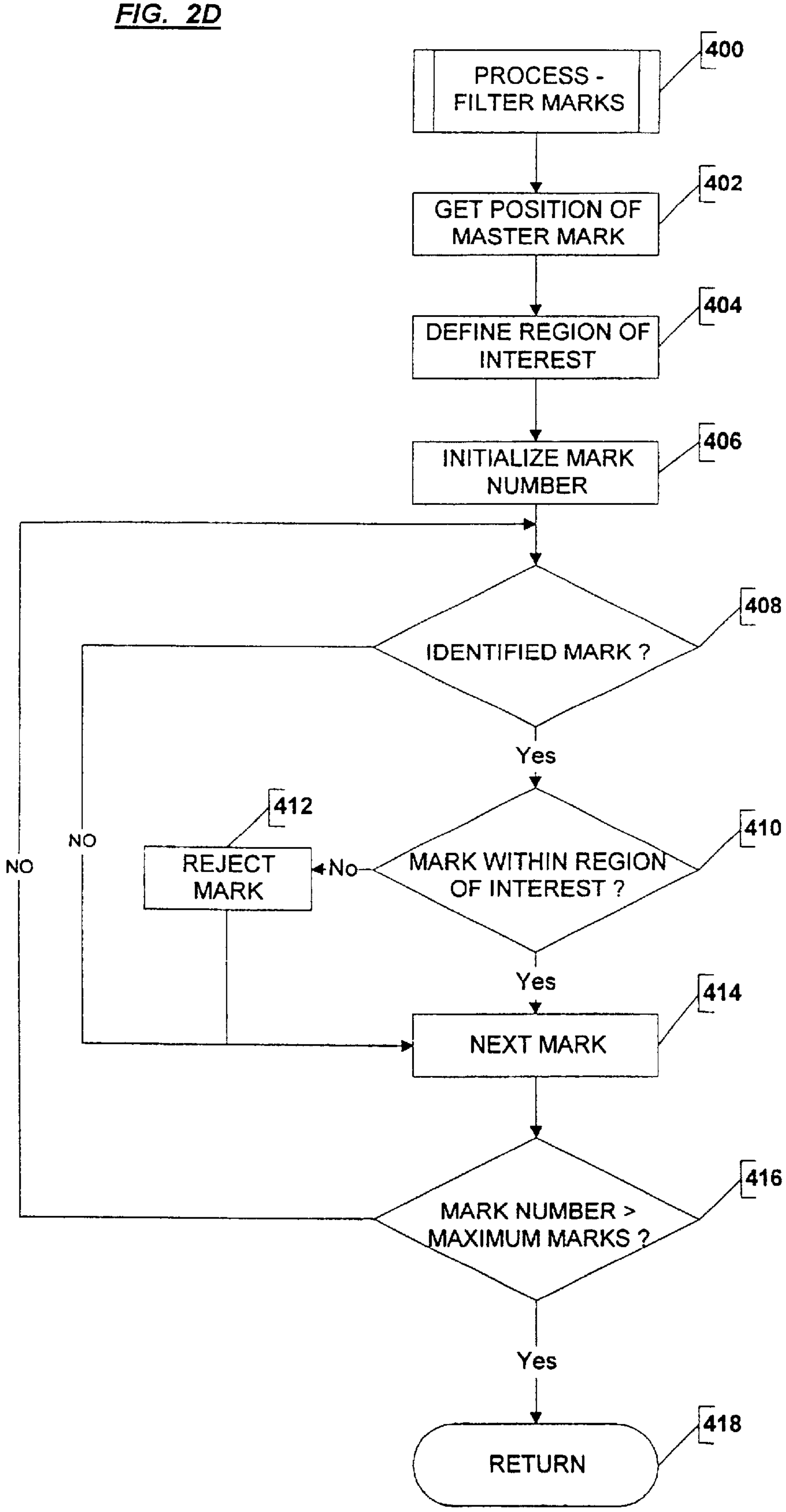
FIG. 2D is a block diagram giving details about filtering duplicate marks(block 110 in FIG. 2) based on region of interest decided by the location of a master mark.

Referring to FIG. 2D, the "Filter Marks" procedure (#10, #400) starts with getting the position (#402) of the master register mark (#80) in the image. Considering ideal location of all register marks in a cluster, including the master register mark, coordinates of the region of interest are established based on the identified location of the master register mark (#404). Next step is to initialize the mark number (#406). This mark is checked for identification tag (#408). If the mark is not tagged as an identified mark from the "Identify Marks" procedure (#300), then the next mark is analyzed (#414). If the mark is tagged as an identified mark, it is checked to see if this mark is within coordinates of region of interest (#410). If the mark is outside of region of interest boundary, the identifying tag of the mark is removed and it is rejected (#412). If the mark is within region of interest boundary, identification tag is not changed and next mark is analyzed (#414). This procedure is continued for all identified marks.(#416).

Each surface of web also has a Master Print Cylinder. The Master Print Cylinder on each surface is locked and it does not move during automatic register error correction. Both Lateral and Circumferential register errors (#116) for print cylinders printing on a surface, are calculated based on the Lateral and Circumferential distance (#112, #114) calculated between the register mark, identified by the print cylinder number and the Master Print Cylinder Register Mark. Register correction motors are activated (#118) to correct the register error.

If the Master Register Mark (#80) for a surface is identified in the acquired image, the location of the Master Register Mark (#80) is compared with the ideal location range to maintain register mark cluster within field of view. If Master Register Mark (#80) is out of acceptable range in lateral direction, AC synchronous motor (#620) is activated to move the imaging assembly to bring the Master Register Mark within acceptable range. If Master Register Mark (#80) is out of acceptable range in circumferential direction the preset count in Encoder Control Board (#704) is adjusted to move the location of strobe illumination to bring the Master Register Mark within acceptable range. If the Master Register Mark for a surface is not identified in the acquired image for a predefined number of image acquisitions, the control switches to the search mode. In this mode, the control starts searching for the register mark cluster in the neighborhood of the last successful identification of the Master Register Mark. This is achieved by moving the camera module for the surface and scanning the circumferential neighborhood b) indexing the location of image along the running direction of the web. When the Master Register Mark is successfully identified in an acquired image, the control suspends the search mode and resumes its automatic operation for that specific surface.

The above mentioned procedure is performed each time an image is acquired from a web surface. If the register mark corresponding to a print cylinder is identified successfully, the status circle (#824) next to the cylinder on the operator interface turns green. If the register mark is not identified successfully, the status circle turns red.

Also, for each image analyzed, the lateral and circumferential location of master register mark is stored. This information is continuously used to keep the mark cluster within the field of view of the camera. If the master register mark location deviates from its ideal location, corresponding camera module is moved in appropriate direction and corresponding encoder preset value is changed appropriately so as to keep the master register mark within certain allowable area from its ideal location.

To lock a surface in Automatic register correction mode, the operator selects the surface (s) from the screen and touches the Auto button (#914). At this point the operator has three choices. Selection of first choice identifies all register marks on a surface and moves print cylinders to the IDEAL register relation between all print cylinder and master print cylinder. Selection of second choice identifies all register marks on a surface and maintains the CURRENT scanned location for register marks from all print cylinders printing on that surface. Selection of third choice brings register marks to a position relationship according to the LAST job run.

Once a web surface is locked in automatic mode, the operator can select a surface and touch a motor enable/disable key (#916) to disable all register motor movement for print cylinders printing on the selected surface. The status circle (#824) next to the cylinder printing on the selected surface on the operator interface turns yellow. To resume automatic register correction motor movements, operator selects the surface currently with disabled motors and then touches the motor enable/disable key.

Operator can also select a print cylinder, which is already locked in automatic mode, and touch Manual button to change status of the selected print cylinder to Manual Override mode. The status circle (#824) on the operator interface next to the selected cylinder turns blinking yellow. In this mode, the control does not perform automatic register corrections. Operator can make register corrections manually by selecting the print cylinder and then entering the amount of movement from the touch keypad, followed by the direction of required movement (See FIG. 5A and accompanying description).

The operator can access camera view window by touching the View button (#886) followed by selecting a surface. This opens a window (See FIG. 5D) on the interface screen to display the exact image acquired by the camera for the selected surface.

Operator can access Statistical Quality Monitoring screen by touching appropriate button (#884) on the screen. The window (FIG. 5C) on the screen graphically shows the register errors for last batch of samples. The sample size is user defined by parameters. To view the register errors detected for last batch of samples, operator selects a print cylinder, followed by selecting the error direction (lateral or circumferential). Statistical results of extreme error, mean error and standard deviation are also displayed in the window, giving accurate idea about consistency of the register quality of the last batch of samples for the selected print cylinder.

A Panic Button (#850) is provided and active all times on the touch screen interface. When this button is touched, any surface locked in automatic mode is switched to manual mode and all register motor operations are suspended.

All job setups performed by the operator can be saved with user defined file names, inputted to the system using keyboard window on touch screen. The number of job files is restricted by size of the magnetic storage media like Hard Disk Drive or Floppy Drive. Stored jobs can be selected and loaded back in memory at a later date, minimizing job setup time and waste for similar and repeat jobs.

All parameters in the control are multi-level password protected. The control is equipped with programmable activation speed, under which the automatic register motor movements are disabled. After the control receives a signal from printing equipment indicating starting of printing process, the control waits for a programmable delay. specified in impressions, before resuming automatic operations. Correction rates for lateral and circumferential directions are also separately programmable for manual and automatic modes.

Figure 3A:
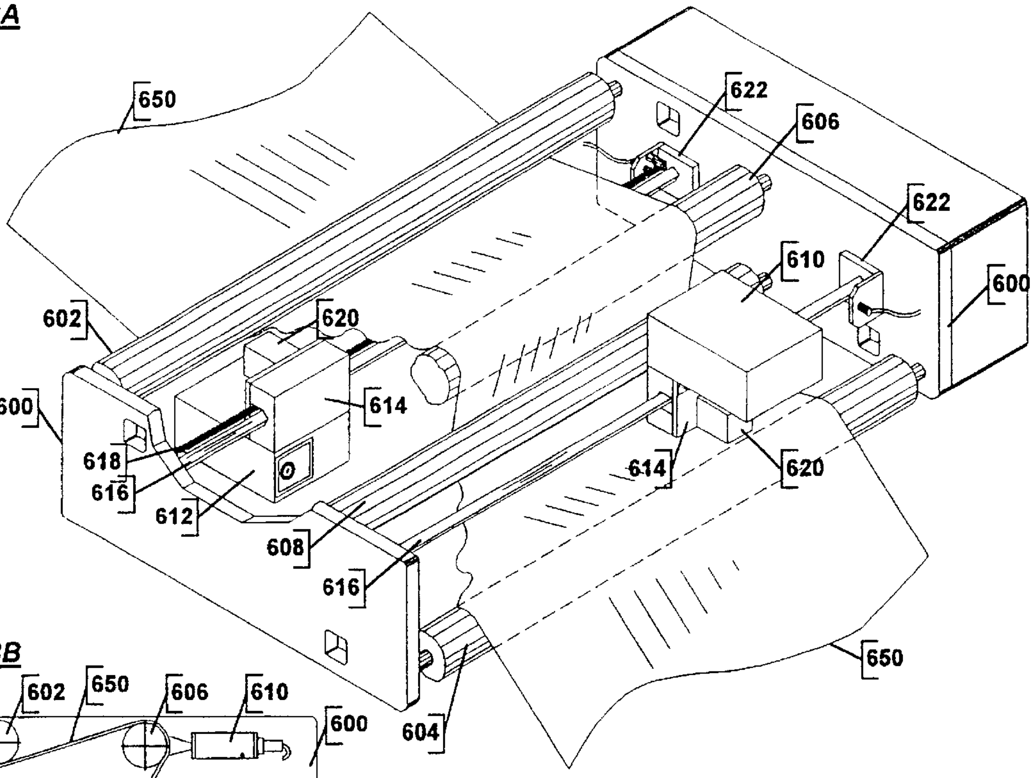
FIG. 3A is an illustration of the apparatus giving details about the web movement and camera module, camera module moving mechanism and associated mechanical components.
Figure 3B:
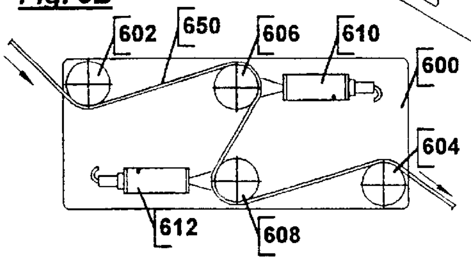
FIG. 3B is a block diagram giving details of web movement direction and the position of two camera modules in the system to scan two surfaces of a web.

The apparatus for scanning the image from the web (#650) is shown in FIG. 3A. It consists of two frames (#600). A web lead-in roller (#602) is provided to accept web (#650) from a previous process equipment. A web lead-out roller (#604) is provided to deliver the web to the next process equipment on the printing line. Between lead-in and lead-out rollers, the web travels over two rollers (#606, #608). The imaging assembly consisting of a CCD camera and a strobe light (#610) scans the top side of the web passing over roller (#606). The imaging assembly consisting of a CCD camera and a strobe light (#612) scans the bottom side of the web passing under roller (#608). Both imaging assemblies (#610, #612) are mounted on a carriage (#614), which moves and positions the camera modules at an operator specified location across web width. The carriage (#614) is equipped with v-groove guide wheels and the guide wheels keep the camera on the guide (#616). The carriage is also equipped with an AC Synchronous Motor (#620) and a timing belt pulley. A timing belt (#618) is provided across the width of the carriage guide. Rotation of the motor (#620) on the carriage moves the carriage (#614), motor (#620) and imaging assembly (#612, #614) across the web. Carriage guide is mounted on the mounting brackets (#622), which is subsequently mounted on the frames (#600).

Figure 4:
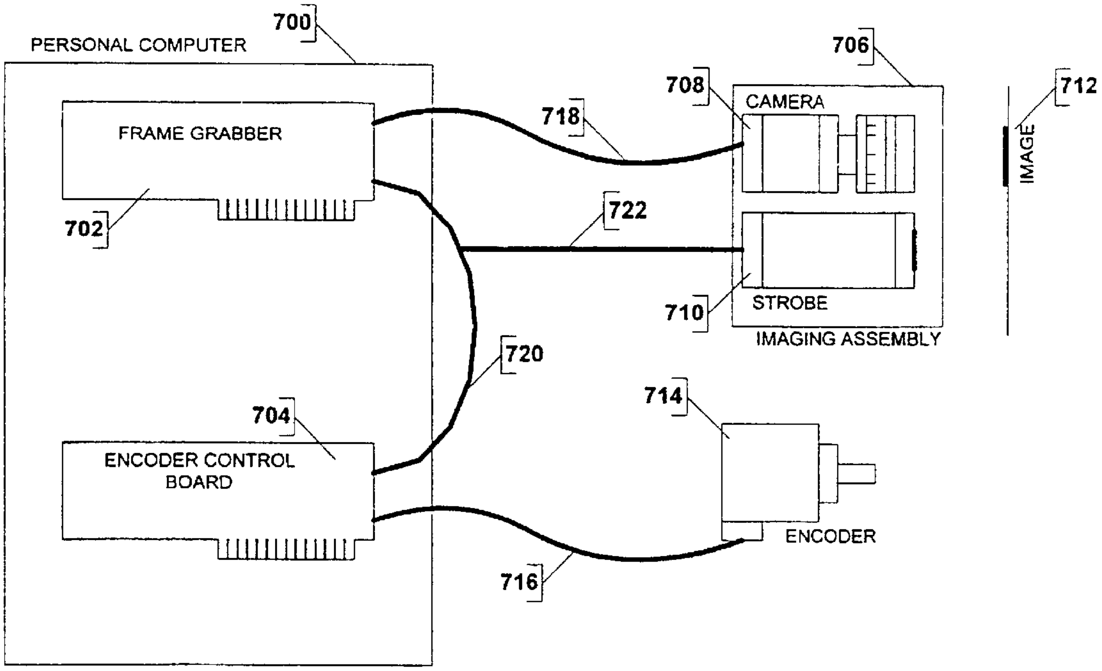
FIG. 4 is a functional block diagram depicting the general arrangement of certain components of the present control system.

FIG. 4 is a block diagram giving general arrangement of different components of the control. The main processor of the control is an Intel Pentium Micro-processor based Personal Computer (#700) with ISA and/or PCI expansion slots. In addition to the standard components of a personal computer, like power supply, video display card, hard drive, motherboard and related electronics, the control utilizes one commercially available Frame Grabber Board (#702), like Data Translation DT55, for each surface to be monitored. One Encoder Control Board (#704) is inserted in the PC expansion slot. One commercially available encoder, like Dynapar HA625, is used to monitor drive shaft position of the printing apparatus. The system also consists of an imaging assembly consisting of commercially available CCD camera (#708), like Hitachi KP-M1, and a commercially available Strobe Light (#710), like EG&G MVS-4000.

Encoder Control Board accepts two channels of pulses and a channel of reset pulse from an encoder (#714) through cable (#716). The encoder is driven from a drive shaft of the printing press. The encoder is commercially available from various sources like Dynapar. All Encoder channels carry a complimentary signal for noise immunity. Two channels of pulses from encoder are in quadrature, at 90 degree out of phase. The encoder control board consists of quadrature decoding circuit to get a count on each rising and falling pulse of both encoder channels. The reset pulse channel gives one reset pulse for every revolution, which resets the counts in encoder control board. Based on circumferential location of the image (#712) set by the control operator, a number is passed from the personal computer to the encoder control board. Encoder Control Board continuously monitors the count from an encoder, and thus it monitors the position of the drive shaft which is also the position of the print. When the count in the encoder control board is equal to the count preset by personal computer, the encoder control board gives a trigger signal to the associated Frame Grabber (#702) through cable (#720) and the associated Strobe (#710), through cable (#722), in the corresponding imaging assembly (#706). In response to the trigger signal from the encoder control board, the strobe emits intense and a very short burst of light. Since camera (#708), like Hitachi KP-M1, in the imaging assembly is run in continuous mode, the strobed image of the surface under camera is acquired in the camera. The camera has built-in synchronizing circuits to generate video synchronization signals. The trigger signal from the encoder control board also gives a signal to the Frame Grabber to store the next complete frame of image from the camera through cable (#718). When Frame Grabber has finished storing the image, it sets an internal flag to indicate that it has a new image stored. Personal Computer constantly monitors the status of this flag. If a new frame of image is received, the CPU analyzes it. After analysis is completed, the CPU resets the flag in the Frame Grabber. The Frame Grabber acquire a new frame of image only if the flag is in reset condition.

The encoder control board consists of up to four count and compare circuits for up to four surfaces to be monitored by the control. The above mentioned procedure for image acquisition is applied to all the surfaces monitored by the control.

It will be understood that the embodiments described herein are merely exemplary and that a person skilled in the art may make many variations and modifications without departing from the spirit and scope of the invention. All such modifications and variations are intended to be included within the scope of the invention as described herein.

What is claimed is:

1. Apparatus for identifying each register mark in a register mark cluster in a multi-color automatic registration system, including a plurality of register marks, a respective one of said register marks printed on a surface by a corresponding one of a plurality of print cylinders, said apparatus comprising:

each of said register marks having a geometrically unique shape different from the remaining ones of said register marks including each having a uniquely different, visually apparent, perimeter profile, each of said register marks, when a predetermined registration is achieved, printed at a separate, respective position on said surface which is neither co-extensive with or overlapping of the respective positions of any one of said other register marks;

means for locating each possible register mark and for determining position and size information for each possible register mark;

means for identifying the geometrically unique shape of each register mark;

means for identifying a region of interest on said surface; and, means for correlating the geometrically unique shape of each register mark with pre-defined shapes assigned to different print cylinders printing on the surface, whereby close registration between colors printed on the surface by said plurality of print cylinders is maintained.

2. The apparatus of claim 1 wherein the register mark cluster comprises a pattern in which each mark is geometrically unique and associated with a different print cylinder.

3. The apparatus of claim 1 wherein the means for locating a possible register mark comprises means for determining position coordinates and means for qualifying each possible register mark.

4. The apparatus of claim 3 wherein the means for qualifying each register mark includes means for determining height and width of each register mark and comparing it with an allowable range of height and width respectively.

5. The apparatus of claim 1 wherein each said register mark includes at least one lobe, said means for identifying shape of each register mark includes means for identifying number and location of lobes present on each said register mark.

6. The apparatus of claim 1 wherein said means for identifying region of interest includes means for identifying a master register mark with a pre-defined shape on the surface and defining a region of interest based on coordinates of said master register mark and means of filtering register marks.

7. The apparatus of claim 6 further including means of filtering register marks including means for comparing position coordinates of each register mark with the coordinates of said region of interest and rejecting marks outside of said region of interest as possible register marks.

8. The apparatus of claim 1 wherein said means for correlating shape of each register mark with pre-defined shapes includes means for comparing a lobe pattern of each register mark with pre-defined lobe patterns assigned to each printing cylinder and tagging a respective print cylinder lobe pattern identification to each said register mark.

9. A method of identifying color to color register marks printed on a moving web comprising a plurality of geometrically unique register marks in a multi-color automatic registration system, the method comprising the steps of:

providing each of said register marks with a geometrically unique shape different from the remaining ones of said register marks including each having a uniquely different, visually apparent, perimeter profile;

printing each of said register marks, when a predetermined registration is achieved, at a separate, respective position on said surface which is neither co-extensive with or overlapping of the respective positions of any one of said other register marks;

acquiring an image of a moving web;

locating all blobs in the acquired image, each of said blobs having a respective width and height;

qualifying each of said blobs by assuring that a respective blob width is within an allowable width range and a respective blob height is within an allowable height range;

identifying possible register marks by identifying a geometrically unique shape of each possible register mark;

identifying a master register mark and defining a region of interest based on coordinates of said master register mark; and rejecting possible register marks outside of said region of interest.

10. The method of claim 9 wherein an acceptable register mark includes at least one lobe, the step of identifying the geometrically unique shape of each register mark comprises identifying the number and location of lobes present on each register mark.

11. The method of claim 9 wherein the step of identifying a master register mark, wherein an acceptable master register mark includes at least one lobe, comprises comparing the number and location of lobes of a register mark with a pre-defined lobe pattern for a master register mark.

12. Apparatus for providing a trigger signal of a short duration for illuminating a moving printed web at a specific location and for acquiring an image of the illuminated moving printed web, comprising:

means for identifying a location of the moving printed web including an encoder, said encoder driven synchronously to the print cylinders said encoder including an encoder control board comprising of a plurality of counters to count the pulses from said encoder and to compare the count accumulated in the counters with a preset position count for said predetermined location on the moving printed web;

means for comparing said location of the moving printed web with a predetermined location on said printed web; and means for providing a trigger signal at said predetermined location, wherein said means for providing a trigger signal comprises an output circuit to provide a trigger signal of predetermined short duration, when said accumulated count by said encoder control board is equal to the preset position count, whereby said moving printed web is illuminated at the beginning of the trigger signal and the image acquired at the end of the trigger signal.

13. Apparatus for maintaining a register mark cluster, including a plurality of register marks, in a field of view across and along a printed web of an automatic color to color register system for a printing press employing a plurality of print cylinders, comprising:

each of said register marks having a geometrically unique shape different from the remaining ones of said register marks including each having a uniquely different, visually apparent, perimeter profile, each of said register marks, when a predetermined registration is achieved, printed at a separate, respective position on said web which is neither co-extensive with or overlapping of the respective positions of any one of said other register marks, each of said register marks associated with a different one of said print cylinders;

means for locating each possible register mark and for determining position and size information for each possible register mark;

means for identifying a respective shape of each possible register mark;

means for identifying a master register mark;

means for maintaining said master register mark in a lateral direction across a specified area within said field of view; and, means for maintaining said master register mark, in a circumferential direction along said specified urea within said field of view.

14. The apparatus of claim 13 wherein the means for locating each possible register mark comprises means for determining position coordinates and means for qualifying each possible register mark.

15. The apparatus of claim 14 wherein the means for qualifying each possible register mark comprises means for determining height and width of each possible register mark and comparing it with an allowable range of height and width respectively.

16. The apparatus of claim 13 wherein an identified register mark must include at least one lobe, said means for identifying a respective shape of each possible register mark comprises means for identifying the number and location of lobes present on a register mark.

17. The apparatus of claim 13 wherein an identified register mark must include at least one lobe, said means for identifying a master register mark comprises means for comparing the number and location of lobes of a possible register mark with a pre-defined lobe pattern as to number and location for a master register mark.

18. The apparatus of claim 13 wherein said means for maintaining said master register mark within said specified area comprises means for moving an imaging assembly across the web, based on said master register mark location, in a lateral direction.

19. The apparatus of claim 13 wherein means for maintaining said master register mark within said specified area b comprises means for adjusting a preset count on an encoder control board, based on the master register mark location in a circumferential direction.

* * * * *

UNITED STATES PATENT AND TRADEMARK OFFICE
CERTIFICATE OF CORRECTION

PATENT NO. : 6,621,585 B1
DATED : September 16, 2003
INVENTOR(S) : Manojkumar Patel and Piyushkumar Patel It is certified that error appears in the above-identified patent and that said Letters Patent is hereby corrected as shown below:

Column 16,
Line 2, change the word "urea" to -- area --.

Signed and Sealed this

Thirtieth Day of December, 2003

JAMES E. ROGAN
*Director of the United States Patent and Trademark Office*